United States Patent
Fan et al.

(10) Patent No.: US 6,447,717 B1
(45) Date of Patent: Sep. 10, 2002

(54) COMPOSITION AND METHOD FOR INHIBITION OF METAL CORROSION

(75) Inventors: Joseph C. Fan; Lai-Duien Grace Fan, both of Lake Zurich; Jacob Mazo, Wilmette, all of IL (US)

(73) Assignee: Donlar Corporation, Bedford Park, IL (US)

( * ) Notice: Subject to any disclaimer, the term of this patent is extended or adjusted under 35 U.S.C. 154(b) by 0 days.

(21) Appl. No.: 09/325,985

(22) Filed: Jun. 4, 1999

(51) Int. Cl.[7] .................................................. C23F 11/00
(52) U.S. Cl. ............................... 422/7; 422/12; 422/17
(58) Field of Search ................................. 422/7, 12, 17

(56) References Cited

U.S. PATENT DOCUMENTS

| | | | |
|---|---|---|---|
| 4,971,724 A | 11/1990 | Kalota et al. | 252/390 |
| 5,116,513 A | 5/1992 | Koskan et al. | 210/698 |
| 5,152,902 A | 10/1992 | Koskan et al. | 210/698 |
| 5,284,512 A | 2/1994 | Koskan et al. | 106/416 |
| 5,443,651 A | 8/1995 | Kalota et al. | 134/2 |
| 5,531,934 A | 7/1996 | Freeman et al. | 252/390 |
| 5,607,623 A | 3/1997 | Benton et al. | 252/392 |
| 5,616,278 A * | 4/1997 | Carey et al. | 252/180 |
| 5,616,544 A | 4/1997 | Kalota et al. | 508/508 |
| 5,776,875 A | 7/1998 | Tang et al. | 510/247 |
| 5,853,619 A | 12/1998 | Watson et al. | 252/391 |
| 6,117,364 A * | 9/2000 | Vorderbruggen et al. | 252/395 |

* cited by examiner

*Primary Examiner*—Krisanne Thornton
(74) *Attorney, Agent, or Firm*—Olson & Hierl, Ltd.

(57) ABSTRACT

Carbon dioxide induced corrosion of ferrous metals in aqueous systems is inhibited by treatment of the aqueous system with corrosion inhibiting amino thiol and amino disulfide compounds. Particularly effective inhibitors are the natural amino acids cysteine and cystine and their decarboxylated analogues cysteamine and cystamine. Novel corrosion inhibiting compositions comprising a combination of amino thiol or amino disulfide compounds with acidic amino acid polymers are also disclosed.

14 Claims, No Drawings

COMPOSITION AND METHOD FOR INHIBITION OF METAL CORROSION

TECHNICAL FIELD

This invention relates to a composition and method for inhibiting the corrosion of metals in carbon dioxide containing aqueous systems. More particularly, this invention relates to the use of amino thiol or amino disulfide compounds as corrosion inhibitors in carbon dioxide containing aqueous systems. This invention further relates to the use of acidic amino acid polymers together with the amino thiol or disulfide compounds as corrosion inhibitors in carbon dioxide containing aqueous systems.

BACKGROUND OF THE INVENTION

Oil bearing geologic formations generally contain mixtures of crude oil and mineral laden waters, hereinafter referred to as formation waters. Oil wells produce a mixture of crude oil and formation water. As wells age, the natural pressures within the formation decrease, thus leading to decreased production of oil. Wells can be artificially pressurized to force the oil and formation water out of the well, however. In offshore oil platforms, sea water is pumped into the wells to displace the oil from the formation. The mixture of sea water and formation water that results from this process is referred to as "produced water." In many cases, the oil bearing formations have very low levels of dissolved oxygen (anaerobic). Often, the formation waters are saturated with dissolved carbon dioxide (known as sweet wells) with or without dissolved hydrogen sulfide (sour wells), which both result in an acidic pH environment, wherein the pH can range from about 3 to about 6. The acidic, highly mineral laden waters produces an environment that is highly corrosive to metals, particularly to mild steel, which is the most common material of construction for well pipe lines and equipment, due to cost considerations.

Carbon dioxide induced corrosion differs from oxygen induced corrosion in that iron carbonates and other iron salts are the main corrosion products, as opposed to iron oxide formation (rust) in aerobic systems. Mineral scale formation, caused by temperature and pressure changes in the mineral laden formation and especially in produced waters can either stimulate or inhibit corrosion, depending on the type and physical form of the scale and the pH, temperature and other factors. The expense of cleaning and replacing miles of corrosion and scale damaged pipelines and other equipment on remote oil platforms, and the loss in revenues from diminished oil production can be enormous.

Chemical additives, known as inhibitors, are commonly added to prevent the formation of scale and to inhibit the corrosion process. The control of scale and corrosion in offshore oil production has traditionally required complex mixtures of corrosion and scale inhibiting compounds. Many types of corrosion inhibitors are also physically incompatible with scale inhibitors, however. This results in the need to apply these chemicals as separate treatments.

Many classes of chemicals, of widely varying structures, have been used for the inhibition of metal corrosion. See, for example, reviews on inorganic and organic corrosion inhibitors by Nathan, "Corrosion Inhibitors" *Kirk-Othmer Encyclopedia of Chemical Technology*, $2^{nd}$ Edition, Volume 6, John Wiley & Sons, New York pp. 317–346 (1965) and by Trabelli, et al. "Mechanism and Phenomenology of Organic Inhibitors" *Advances in Corrosion Science and Technology*, Volume 1, Plenum Press, New York, pp.147–228 (1970). Many classes of corrosion inhibitors useful in oilfield applications are highly toxic and in some cases non-biodegradable. Many corrosion inhibitors interfere with the oil—water separation process, which interference results in relatively larger amounts of crude oil contaminants in the produced water that is discharged into the ocean after separation.

There is a growing concern regarding the environmental impact of scale and corrosion inhibitors, as well as the oil contaminants that are currently being released into sensitive marine ecosystems such as the North Sea through their use in the oil production industry.

Polyaspartates are biodegradable, low toxicity materials with known corrosion inhibiting activity. U. S. Pat. No. 5,607,623 to Benton, et al. describes the use of polyaspartates to inhibit ferrous metal corrosion in carbon dioxide containing aqueous systems. Polyaspartates are useful corrosion inhibitors, affording 70 to 85% corrosion inhibition in carbon dioxide containing oilfield brines. In addition, U.S. Pat. Nos. 5,116,513 and 5,152,902 to Koskan et al. disclose the use of polyaspartates to inhibit the formation of mineral scale in aqueous systems. The combined effects of scale and corrosion inhibition in a single additive is a particularly useful feature of polyaspartates.

Amide derivatives of long chain amines have been proposed as environmentally acceptable corrosion inhibitors in oil production applications. See for example Darling, et al., "Green Chemistry Applied to Corrosion and Scale Inhibitors" *CORROSION* 98, Paper No. 207, National Association of Corrosion Engineers (1998). Unfortunately, such materials can be difficult to formulate and can adversely affect the oil water separation process. Thioglycolic acid (mercaptoacetic acid), which is relatively low in toxicity, is known to be an inhibitor of corrosion. Thioglycolic acid has been used as a corrosion inhibitor in oilfield applications, however it is only partially effective at inhibiting corrosion in a carbon dioxide saturated environment See, for example, U.S. Pat. No. 5,853,619 to Watson et al.

There is a need, therefore, for more environmentally acceptable, biodegradable and low toxicity inhibitors of metal corrosion in carbon dioxide containing aqueous systems where hydrogen sulfide also may be present. Further, there is a need for corrosion inhibitors that are compatible with scale inhibitors and that do not interfere with the oil—water separation process. The present invention satisfies these needs.

SUMMARY OF THE INVENTION

Ferrous metal corrosion in carbon dioxide containing aqueous systems can be effectively and efficiently achieved with environmentally acceptable materials. In particular, we have found that amino thiol or amino disulfide compounds of the structure:

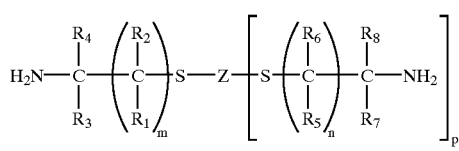

wherein $R_1$, $R_2$, $R_3$, $R_4$, $R_5$, $R_6$, $R_7$ and $R_8$ are, independently of one another, members of the group consisting of hydrogen, carboxyl, $C_1$ to $C_{18}$ alkyl, and $C_6$ to $C_{10}$ aryl;

Z is a member of the group consisting of hydrogen and covalent bond;

m and n are, independently of one another, 1, 2 or 3; and p is zero or 1, with the proviso that p is zero when Z is hydrogen; in relatively low concentrations are effective inhibitors of ferrous metal corrosion in mildly acid aqueous systems containing dissolved carbon dioxide. Preferred such compounds are cysteine, cystine, cysteamine, cystamine, and salts thereof.

The environmentally acceptable corrosion inhibitors of the present invention are useful for the inhibition of ferrous metal corrosion in aqueous systems that are corrosive due to the presence of dissolved carbon dioxide found in oil producing formations. In oil production terminology, such aqueous systems are referred to as "sweet" for carbon dioxide containing formations and "sour" for systems that contain hydrogen sulfide as well. Sweet and sour conditions are both common problems leading to corrosion in oil producing assets in offshore oil production.

The amino thiol and amino disulfide inhibitor compounds suitable for practicing the methods of the present invention are low in toxicity and provide effective corrosion control at concentrations in the range of about 0.1 ppm to about 1000 ppm. Some of the preferred corrosion inhibitors utilized in the methods of the present invention are naturally-occurring materials such as the common amino acids cysteine and cystine.

In another aspect of the present invention, the aforesaid inhibitor compounds are used together with an acidic amino acid polymer such as a polyaspartate and the like. The resulting corrosion inhibiting compositions have a very low environmental impact when released into ocean waters due to biodegradability and low toxicity. In addition, the resulting combined inhibitor compositions are effective for both corrosion inhibition and scale inhibition in acidic oilfield brines containing dissolved carbon dioxide. Surprisingly, the corrosion inhibiting effect of a component inhibitor formulation that includes an acidic amino acid polymer is superior in performance to either of the individual corrosion inhibiting components alone.

DETAILED DESCRIPTION OF THE INVENTION

One method aspect of the present invention involves a treatment of a carbon dioxide containing aqueous system, which comprises:

adding to said aqueous system a corrosion inhibiting amount of an amino thiol or disulfide inhibitor compound of the structure:

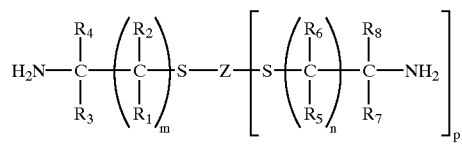

wherein $R_1$, $R_2$, $R_3$, $R_4$, $R_5$, $R_6$, $R_7$ and $R_8$ are, independently of one another, members of the group consisting of hydrogen, carboxyl, $C_1$ to $C_{18}$ alkyl, and $C_6$ to $C_{10}$ aryl;

Z is a member of the group consisting of hydrogen and covalent bond;

m and n are, independently of one another, 1, 2 or 3; and p is zero or 1, with the proviso that p is zero when Z is hydrogen.

The amino thiol and amino disulfide corrosion inhibitors of the present invention can be made by a variety of methods known in the chemical arts. Thiol functional groups, also known as mercaptans, and primary amine functional groups, can be produced by a variety of known methods. See, for example, methods of production of mercaptans and of amines in Jerry March, *Advanced Organic Chemistry*, Second Edition, McGraw-Hill Book Company, New York, N.Y. (1977), the relevant portions of which are incorporated herein by reference.

Inhibitors of the foregoing structure in which m and/or n=1 may be obtained by the reaction of ammonia with episulfides or by the reaction of a hydrosulfide ion with aziridines.

Such inhibitor compounds are generally low in toxicity and biodegradable. Some preferred inhibitor compounds of the present invention are naturally occurring materials such as $H_2N$—$CH(CO_2H)$—$CH_2$—$SH$ (cysteine) and
$H_2N$—$CH(CO_2H)$—$CH_2$—$S$—$S$—$CH_2$—$CH$ $(CO_2H)$—$NH_2$ (cystine), both of which commonly occur naturally in proteins.

Other preferred inhibitor compounds useful in the method of the present invention include $H_2N$—$CH_2$—$CH_2SH$ (cysteamine), which can be obtained by the reaction of ethanolamine with carbon disulfide via 2-mercaptothiazoline as described by J. Bogert in the Journal of the American Chemical Society, Vol. 62, p1173 (1940) and 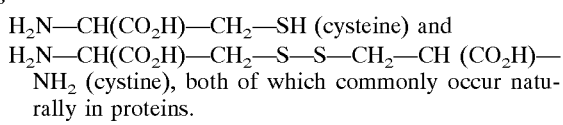 (cystamine), which is formed by the destructive distillation of cystine and is also the dimer of cysteamine, which forms upon exposure of cysteamine to hydrogen peroxide. Id. Cysteine, cystine, cysteamine and cystamine, as well as their respective acid addition salts, are all readily commercially available from chemical supply houses such as Sigma Aldrich Fluka (Milwaukee, Wis.). Amino disulfides of the present invention may form spontaneously from amino thiols of the present invention via in situ oxidative mechanisms.

Many of the preferred inhibitor compounds of the present invention can exist as optical isomers. For example cysteine can exist as the natural L-isomer (L-cysteine) or as the D-isomer (D-cysteine), or as a mixture of the two (D,L-cysteine). Likewise, cystine, with two optical centers may exist as the L,L-form, the D,D-form, the D,L-form and any mixture thereof. All of the optical isomers of the inhibitors of the present invention in free base or salt form are useful for the inhibition of ferrous metal corrosion in aqueous carbon dioxide-containing systems.

Other, non-limiting examples of amino thiol and amino disulfide compounds useful for the methods and compositions of the present invention include: 1-amino-2-methyl-2-thiopropane, 1-amino-3-thiopropane, 1-amino-4-thiobutane, 2-amino-3-methyl-1-thiobutane, 2-amino-1-thiohexane, 2-amino-3,3-dimethyl-1-thiobutane, 1-amino-2-thiopropane, 2-amino-3-methyl-3-thiobutanecarboxylic acid (penicillamine), 2-amino-3-thiobutanecarboxylic acid (homocysteine), 2-amino-2-methyl-1-thiopropane, 1-amino-2-thiohexane, 2-amino-1-thiohexadecane, 2-amino-3-thioadipic acid, 2-amino-3-thio-3-phenylpropanecarboxylic acid, 1-amino-2-thio-1,2-diphenylethane, 2-(2-amino-1-thioethyl)-naphthalene, and disulfides thereof.

For practical purposes, the amino thiol and disulfide inhibitor compounds of the present invention may be utilized in their respective salt forms. The inhibitor may be used in the form of a salt of a mineral acid, sulfonic acid, phosphonic acid or organic acid. Preferred mineral acids include, but are not limited to, hydrochloric acid, hydrobromic acid, sulfuric acid, phosphoric acid and nitric acid.

Preferred sulfonic acids include $C_1$ to $C_{20}$ alkyl sulfonic acids, such as methane sulfonic acid, propane sulfonic acid and the like, aryl sulfonic acids, such as benzene sulfonic acid and toluene sulfonic acid, and polymeric sulfonic acids such as polyvinyl sulfonic acid. Preferred phosphonic acids include $C_1$ to $C_{20}$ alkyl phosphonic acids, aryl phosphonic acids, and phosphonocarboxylic acids. Preferred organic acids include $C_1$ to $C_{20}$ alkyl carboxylic acids, such as acetic acid, propionic acid, butyric acid, fatty acids, and the like, aryl carboxylic acids such as benzoic acid, toluic acid and the like, and polycarboxylic acids such as succinic acid, maleic acid, citric acid, tartaric acid and the like.

The amino thiol and disulfide inhibitor compounds of the present invention are added to the acidic aqueous system containing carbon dioxide such that the concentration of the inhibitor compound in the aqueous system is in the range of about 0.01 ppm to about 1000 ppm. Preferably, the inhibitor compound is utilized at a concentration in the range of about 0.1 ppm to about 100 ppm, and most preferably, the inhibitor compound is present in the aqueous system at a concentration of about 1 ppm to about 50 ppm.

Another aspect of the present invention is a method of inhibiting ferrous metal corrosion in a carbon dioxide containing aqueous system, which comprises:

a) adding to said aqueous system a corrosion inhibiting amount of an amino thiol or disulfide inhibitor compound of the structure:

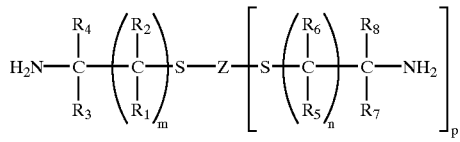

wherein $R_1$, $R_2$, $R_3$, $R_4$, $R_5$, $R_6$, $R_7$ and $R_8$ are, independently of one another, members of the group consisting of hydrogen, carboxyl, $C_1$ to $C_{18}$ alkyl, and $C_6$ to $C_{10}$ aryl;

Z is a member of the group consisting of hydrogen and covalent bond;

m and n are, independently of one another, 1, 2 or 3; and p is zero or 1, with the proviso that p is zero when Z is hydrogen; and b) adding to said aqueous system a scale and corrosion inhibiting amount of an acidic amino acid polymer.

The terms polymer of acidic amino acid and acidic amino acid polymer or any grammatical variation thereof, as used herein and in the appended claims shall be deemed equivalent and shall include the acid form of said polymers as well as their salts. These salts may be alkali metal salts, ammonium salts, alkyl ammonium salts, aryl ammonium salts, and the like.

Preferred acidic amino acid polymers comprise polymers of acidic amino acids such as aspartic acid, glutamic acid and mixtures thereof. Acidic amino acid polymers comprising aspartic acid and glutamic acid units are well known in the chemical art.

Particularly preferred acidic amino acid polymers useful in practicing the present invention are polymers or co-polymers of at least one acidic amino acid such as aspartic acid in either α-form, β-form, or optionally containing cyclic imide (succinimide) units, as well as glutamic acid in either α-form, or β-form, or a derivative thereof. The preferred molecular size of the polymer or co-polymer is in the range of about 500 to about 100,000 daltons, weight average molecular weight (Mw), as measured by size exclusion chromatography using polyacrylic acid standards for comparison. A more preferred molecular size of the polymer or co-polymer is in the range of about 500 to about 50,000 daltons. The most preferred molecular size of the polymer or co-polymer is in the range of about 1000 to about 20,000 daltons. The acidic amino acid residue content of the polymer or co-polymer is preferably in the range of about 20 mole percent to about 100 mole percent. For example, the utilized polymeric component can be polyaspartic acid, polyglutamic acid or a block or random copolymer containing a) at least one amino acid derived moiety selected from the group consisting of aspartic acid and glutamic acid, and b) one or more co-monomers selected from the group consisting of polybasic carboxylic acids and anhydrides, fatty acids, polybasic hydroxycarboxylic acids, monobasic polyhydroxycarboxylic acids, amines, di and triamines, polyamines, hydroxyalkyl amines, carbohydrates, sugar carboxylic acids, amino acids, non-protein forming aminocarboxylic acids, lactams, lactones, diols, triols, polyols, unsaturated dicarboxylic and tricarboxylic acids, unsaturated monocarboxylic acids, derivatized aspartic acid residues, and derivatized glutamic acid residues; wherein: the sum of the aspartic and/or glutamic acid residues is at least about 20% of the total number of residues in the polymer.

Most preferred acidic amino acid polymers useful in the compositions and methods of the present invention include polyaspartic acid, polyglutamic acid, and salts and copolymers thereof. Illustrative of the salts is sodium polyaspartate.

Acidic amino acid polymers useful in the methods of the present invention can be made by a variety of methods known in the chemical art. See, for example, U.S. Pat. Nos. 5,057,597, No. 5,116,513, No. 5,219,952, No. 5,221,733 and No. 5,756,595 to Koskan et al., the disclosures of which are incorporated herein by reference, which describe inexpensive methods for the manufacture of polysuccinimide, polyaspartic acid and salts thereof. Polyaspartic acid salts are obtained by the alkaline hydrolysis of polysuccinimide to produce the corresponding polyaspartate. Other methods of production of acidic amino acid polymers include thermal co-polymerization of amino acids to form acidic amino acid polymers is described by Fox et al. "Thermal Polymerization of Amino Acids in the Presence of Phosphoric Acid, Archives of Biochemistry and Biophysics, vol 86, pp 281–285 (1960); and polymerization of thermal precursors of aspartic acid such as ammonium fumarate and ammonium maleate as described in Harada "Polycondensation of Thermal Precursors of Aspartic Acid", Journal of Organic Chemistry, vol. 24 pp. 1662–1666 (1959). In addition, processes for the polymerization of precursors of aspartic acid to form polysuccinimide and polyaspartic acid are described in U.S. Pat. No. 5,296,578 to Koskan et al., in U.S. Pat. No. 5,491,213 to Batzel, in U.S. Pat. No. 5,466,779 to Ross and in U.S. Pat. No. 5,681,920 to Vallino et al., the disclosures of which are incorporated herein by reference.

Acidic amino acid polymers comprising aspartic acid with co-monomers such as polybasic carboxylic acids and anhydrides, fatty acids, polybasic hydroxycarboxylic acids, monobasic polyhydroxycarboxylic acids, alcohols, amines, di and triamines, polyamines, alkoxylated alcohols and alkoxylated amines, alkoxylated diamines and triamines, amino sugars, hydroxyalkyl amines, carbohydrates, sugar carboxylic acids, amino acids, non-protein forming aminocarboxylic acids, lactams, lactones, diols, triols, polyols, unsaturated dicarboxylic and tricarboxylic acids, unsaturated monocarboxylic acids can be made by a variety of methods described in the literature.

See for example, U.S. Pat. No. 5,510,427 to Wood, which describes a method of preparing polyaspartate copolymers by polymerization of maleic acid, and ammonia with a diamine or triamine, followed by hydrolysis with base; U.S. Pat. No. 5,494,995 to Wood, which describes a method of preparing polysuccinimide copolymers by polymerization of maleic acid, ammonia and a polycarboxylic acid, and optionally with a diamine or triamine; and U.S. Pat. No. 5,484,860 to Wood, which describes a method of preparing polyaspartate copolymers by polymerization of maleic acid, ammonia and a polycarboxylic acid, and optionally with a diamine or triamine, followed by hydrolysis with base. U.S. Pat. No. 5,478,919 to Koskan et al., describes a method of preparation of copolymers of polysuccinimide or polyaspartic acid by co-polymerization of maleic or fumaric acid, ammonia and one or more amino, hydroxyl or carboxyl containing monomer. The relevant portions of each of the foregoing patents are incorporated herein by reference.

See also, U.S. Pat. No. 4,696,981 to Harada, which describes the co-polymerization of maleic or fumaric acid, ammonia and one or more amino acids using microwave heating, to form polysuccinimide copolymers; U.S. Pat. No. 4,892,733 to Bichon et al., which describes copolymers of aspartic or glutamic acid with other natural amino acids; U.S. Pat. No. 5,747,635 to Kroner et al., which describes a method of preparing copolymers of polysuccinimide and polyaspartic acid by co-polymerization of aspartic acid with 99 to 0.1 mole % of one or more polybasic carboxylic acids, polybasic carboxylic acid anhydrides, fatty acids, polybasic hydroxycarboxylic acids, monobasic polyhydroxycarboxylic acids, alcohols, amines, di and triamines, polyamines, alkoxylated alcohols and alkoxylated amines, alkoxylated diamines and triamines, amino sugars, hydroxyalkyl amines, carbohydrates, sugar carboxylic acids, amino acids, non-protein forming aminocarboxylic acids, or by radically initiated graft polymerization of monoethylenically unsaturated carboxylic acids in the presence of polyaspartic acid; and U.S. Pat. No. 5,679,761 to Heuer et al. which describes co-polymers of polyaspartate or polysuccinimide with iminodisuccinate units. The relevant portions of each of the foregoing patents are incorporated herein by reference.

Examples of co-monomers useful in production of the acidic amino acid polymers of the present invention include, but are not limited to, lactic acid; citric acid; glycolic acid; malic acid; tartaric acid; succinic acid; adipic acid; butanetetracarboxylic acid; gluconic acid; glucuronic acid; glucaric acid; aconitic acid; sulfosuccinic acid; phosphinicosuccinic acid; phosphonosuccinic acid; iminodiacetic acid; iminodisuccinic acid; nitrilotriacetic acid; stearic acid; palmitic acid; cyclohexanedicarboxylic acid and anhydride; terephthalic acid; phthalic acid and anhydride; crotonic acid; sorbitol; glycerol; glucose; fructose; sucrose; maltose; glycine; alanine; serine; threonine; cystine; cysteine; ethylenediamine; diethylenetriamine; triethylenetetramine; polyamines, 1,6-diaminohexane; octadecylamine; glucosamine; alkoxylated amines; alkoxylated diamines and triamines; 6-aminocaproic acid; 4-aminobutyric acid; diaminocyclohexane; urea; melamine; hydroxyalkyl amines such as ethanolamine and propanolamine; carbohydrazide; hydrazine; ascorbic and isoascorbic acid; sorbic acid; maleuric acid; cyanuric acid; alkyldiamines; alkyltriamines; acrylic acid; methacrylic acid; maleic acid and anhydride; alkylmaleic acids; alkenylsuccinic acids and anhydrides; and methylenemalonic acid. The term "alkyl" as used herein means that the alkyl group has 1 to 18 carbon atoms.

Acidic amino acid polymers useful in the present invention may also be derivatives of polyaspartates. The chemical modification of polysuccinimide to produce acidic amino acid polymers containing derivatized aspartic acid or glutamic acid units is well known. For example, the above-cited article of Neri, et al. also describes the modification of polysuccinimide with ethanolamine to afford an N-hydroxyethylaspartamide polymeric derivative.

U.S. Pat. No. 3,846,380 to Fujimoto et al. describes the formation of modified polypeptides having hydrophobic and hydrophilic substituents as side chains obtained by reacting polysuccinimide with at least one primary or secondary aliphatic amine in a polar aprotic solvent and hydrolyzing the resulting polyamide derivative with alkali to produce polypeptides that are useful as surface active agents.

Such reactions of polysuccinimide with amines may also be achieved in an aqueous medium by treatment of polysuccinimide with aqueous ammonia or aqueous primary or secondary amines, wherein the products of said reaction are copolymers of aspartic acid ammonium salts and aspartamide units. For example, hydrolysis of polysuccinimide with aqueous ammonia affords a copolymer of aspartamide (a.k.a. asparagine) and ammonium aspartate units in a ratio of about 40:60 to about 60:40.

Examples of derivatized aspartic acid and derivatized glutamic acid residues include materials in which the free carboxyl group of the aspartic acid or glutamic acid residue has been chemically bonded with an amino, hydroxyl or mercapto containing moiety to form an amide, ester or thioester bond.

Examples of acidic amino acid polymers containing derivatized aspartic acid or glutamic acid residues, useful in the methods of the present invention, are found in U.S. Pat. No. 5,506,335 and Pat. No. 5,726,280 to Uhr et al., which disclose polyaspartate alkyl and aryl amide derivatives with sulfonic acid group-containing side chains on the alkyl or aryl moieties; U.S. Pat. No. 4,363,797 to Jacquet et al. describes derivatized polyaspartates bearing amide, mercapto and sulfoalkylamide functional group bearing moieties attached to the polyaspartate by amide bonds to the free carboxyl groups of the polymer; and U.S. Pat. No. 4,314,808 to Jacquet et al. describes derivatized polyaspartates wherein alkyl substituents, functionalized alkyl substituents, dyes and dye precursors are attached to the polyaspartate by amide bonds to the free carboxyl groups of the polymer; and U.S. Pat. No. 3,846,380 to Fujimoto, which describes derivatized polyaspartates wherein $C_1$ to $C_{20}$ alkyl groups, in proportions from 0.005 to 1 substituents per monomer unit, are attached to the polyaspartate by amide bonds to the free carboxyl groups of the polymer. The relevant portions of each of the foregoing patents are incorporated herein by reference.

Additional acidic amino acid polymers useful in the invention, are described in U.S. Pat. No. 5,639,832 to Kroner et al., which discloses a method of derivatizing polysuccinimide with amino acids by reaction of polysuccinimide with amino acids in aqueous medium at pH values wherein at least 5% of the amino acids are in the free amine (non-protonated) form; and PCT Application number WO 96/04332, to Greindl et al., which describes derivatives of polyaspartic acid having hydroxamic acid, hydroxamic ether and/or hydrazide groups in the side chain, formed by reaction of polysuccinimide with hydroxylamine, hydroxylamine alkyl ethers with 1 to 18 C atoms in the alkyl group, N-mono-alkyl hydroxylamines with 1 to 18 C atoms in the alkyl group, and/or hydrazine in aqueous or alcohol media at pH values of at least 7. The relevant portions of each of the foregoing patents is incorporated herein by reference.

Examples of amino, hydroxyl or mercapto containing moieties that may be bonded with aspartic acid or glutamic acid residues to form derivatized aspartic acid or derivatized glutamic acid residues include, but are not limited to: hydrazine; $C_1$ to $C_{20}$ alkyl or $C_6$ to $C_{10}$ aryl substituted hydrazines; hydroxyl amine; $C_1$, to $C_{20}$ alkyl O-substituted hydroxylamines; natural amino acids such as alanine, glycine, leucine, phenylalanine, lysine; non-natural amino acids such as 6-aminocaproic acid, 4-aminobuteric acid, 2-aminobenzoic acid, 4-aminobenzoic acid, or iminodiacetic acid; $C_1$, to $C_{20}$ alkyl amines; aryl amines such as aniline, secondary alkyl amines such as dimethylamine, morpholine, diethylamine, or N-methylsterylamine; substituted alkyl or aryl amines such as taurine, 3-phosphinopropyl amine, or 4-aminobenzenesulfonic acid; $C_1$, to $C_{20}$ alcohols; amino alcohols such as ethanolamine, diethanolamine, or triethanolamine; heterocyclic amines such as 2-aminopyridine, 2-aminopyrazine, 2-aminothiazole, or 2-aminoimidazole; diamines such as ethylenediamine, hexamethylenediamine; alkoxylated diamines such as triethyleneglycol diamine; alkoxylated amines such as amine capped polyethylene oxides or amine capped polypropylene oxides; polyols such as ethylene glycol, propylene glycol, glycerin, polyethylene oxides, polypropylene oxides, sugars, or amino sugars; thiols such as butanethiol, 2-hydroxyethanethiol, or 2-aminoethanethiol; and hydoxycarboxylic acids such as glycolic acid, lactic acid, 2-hydroxybuteric acid, citric acid, tartaric acid, or salicylic acid.

The preferred acidic amino acid polymers useful in the present invention are those polymers in which the sum of the aspartic acid and glutamic acid residues is greater than about 20% of the total number of polymeric residues. More preferred are polymers wherein the sum of the aspartic acid and glutamic acid residues is greater than about 30% of the total number of polymeric residues. Most preferred are polymers wherein the sum of the aspartic acid and glutamic acid residues is greater than about 50% of the total number of polymeric residues.

Yet another aspect of the present invention is an environmentally acceptable scale and corrosion inhibiting composition for use in aqueous systems containing carbon dioxide, such as oil production wells. The compositions of the present invention are low toxicity, biodegradable corrosion and scale inhibiting compositions which comprise:

an amino thiol or disulfide inhibitor compound of the structure:

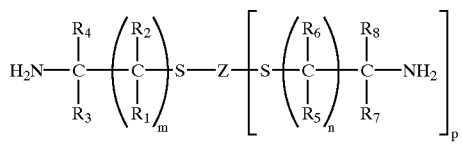

wherein $R_1$, $R_2$, $R_3$, $R_4$, $R_5$, $R_6$, $R_7$ and $R_8$ are, independently of one another, members of the group consisting of hydrogen, carboxyl, $C_1$ to $C_{18}$ alkyl, and $C_6$ to $C_{10}$ aryl;

Z is a member of the group consisting of hydrogen and covalent bond;

m and n are, independently of one another, 1, 2 or 3; and p is zero or 1, with the proviso that p is zero when Z is hydrogen; and an amino acid polymer which includes an acidic amino acid.

The preferred ratios of amino thiol or disulfide compound to acidic amino acid polymers, useful in the compositions of the present invention, are in the range of about 1:1000 to about 1000:1, respectively, on a weight basis. Most preferred is a ratio of amino thiol or disulfide compound to acidic amino acid polymer in the range of about 1:1000 to about 1:10, respectively.

The pH of the carbon dioxide containing aqueous systems in which the compositions and methods of the present invention operate may range form about 2 to about 8, most preferably from about 3 to about 7. The carbon dioxide containing aqueous system may also contain hydrogen sulfide as stated hereinabove.

The methods and compositions of the present invention may be utilized in combination with other additives and adjuvants commonly used in water treatment applications including, but not limited to, other, non-sulfur containing, corrosion inhibitors such as zinc, the molybdates, the quaternary amines, and the imidazolines; other scale inhibitors, such as phosphonates, polyacrylates and polymaleates; biocides such as quaternary amines, and the 3:1 mixture of 5-chloro-2-methyl-4-isothiazolin-3-one and 2-methyl-4-isothiazolin-3-one, sold under the trade name KATHON by Rohm and Haas Company, of Philadelphia, Pa.; oxidizing biocides such as ozone, hydrogen peroxide and chlorine; and surfactants.

In the following, non-limiting examples, the amino thiol and amino disulfide compounds were purchased from Sigma Aldrich Fluka, Milwaukee, Wis. Cystine and cysteamine were utilized as the dihydrochloride salts. Cysteamine was utilized as the hydrochloride salt. Cysteine was utilized as the mono hydrochloride monohydrate salt. Polyaspartic acid was utilized as the sodium salt and was prepared by thermal polymerization of aspartic acid and subsequent hydrolysis with sodium hydroxide to afford sodium polyaspartate in accordance with the method described in U.S. Pat. No. 5,315,010 to Koskan, et al. The produced sodium polyaspartate had weight average molecular weights of approximately 3000 to 5000 daltons as determined by size exclusion chromatography utilizing polyacrylic acid standards for comparison. The molecular weight of the sodium polyaspartate obtained was varied from 1000 to 5000 daltons depending on the amount of aqueous base utilized in the hydrolysis of the polysuccininide intermediate. Hydrolysis with excess hydroxide resulted in the lower molecular weight polyaspartates.

Inhibitor compositions comprising amino thiol or disulfide compounds and acidic amino acid polymers were prepared by dissolving the appropriate amount of amino thiol or amino disulfide in a 40% (w/w) solution of the acidic amino acid polymer, with adjustment of pH, if necessary, to facilitate dissolution of the amino thiol or amino disulfide compounds.

The activity of corrosion inhibitors toward metal corrosion was assayed by the Polarization Resistance method (see ASTM G-59, "Standard Practice for Conducting Potentiodynamic Polarization Resistance Measurements," American Society for Testing and Materials, Philadelphia, Pa.). Linear Polarization Resistance is an electrochemical technique that measures the DC current ($i_{meas}$) through the metal/fluid interface under study by applying a small electric potential difference (ΔE) from the corrosion potential ($E_{corr}$). The variable $i_{meas}$ is related to corrosion current density ($i_{corr}$) by the Stem-Geary equation (Equation 1).

Equation 1:

$$\frac{\Delta E}{i_{meas}} = \frac{\beta_a \beta_c}{(2.303 i_{corr})(\beta_a + \beta_c)}$$

Where:

$\beta_a$=Anodic Tafel Slope $\beta_c$=Cathodic Tafel Slope

The corrosion rate is directly proportional to the corrosion current density, and can be calculated using ASTM G 102 standard method (see ASTM G 102, "Calculation of Corrosion Rates and Related Information From Electrochemical Measurements," American Society For Testing and Materials, Philadelphia, Pa.).

Two related experimental procedures were utilized for evaluating the effectiveness of the inhibitors of the present invention. Method A is a procedure known as the Bubble Test Method, the essential details of which are disclosed in U.S. Pat. No. 5,607,623 to Benton, et al., the appropriate portions of which are incorporated herein by reference. The test involves saturating a synthetic aqueous brine solution with $CO_2$ by continuously sparging carbon dioxide gas into the brine solution, and heating the resulting solution at 56° C. for the duration of the test. The composition of synthetic brine that was utilized contained 29354 ppm sodium, 372 ppm potassium, 504 ppm of magnesium, 31469 ppm of calcium, 496 ppm bicarbonate, 52360 ppm chloride-and 11 ppm sulfate. The test brine was designed to simulate formation water from an oil formation in the North Sea. The pH of the test water was in the range of about 4 to 6. A test probe fitted with a pair of test electrodes was placed into the brine and the corrosion rate was measured every 30 minutes using the linear polarization resistance method (LPR). The measurements of the corrosion rates were made using a Corrator corrosion monitor, Model number RCS 9000, manufactured by Rohrbach Cosasco Systems, Santa Fe Springs, Calif. All tests were performed on 1010 mild steel electrodes. The inhibitor compositions were added to the test solution 2 hours after the immersion of probe, and after a stable corrosion rate of at least 100 mpy had been established. The duration of the test was 20 hours. The final corrosion rate for each experiment is recorded in Table 1.

An alternative procedure, Method B, also referred to as the Dynamic Corrosion Test, utilized a rotating cylindrical electrode in place of the Corrator electrodes. The rotation of the electrode is used to simulate dynamic flow and turbulence in a pipeline. The rotational speed of the electrode was set so as to simulate a linear flow rate of 1 m/s (3.3 ft/s). The brine composition, the temperature and carbon dioxide sparging in the rotating electrode experiments were all essentially the same as in Method A. The corrosion current was continuously measured and stored utilizing a computerized data logger. The data was analyzed and the final corrosion rate was calculated by use of the ASTM G 102 standard method as described above. The final corrosion rates for each experiment are recorded in Table 2.

TABLE 1

Corrosion Rates in Mils Per Year (mpy) of Mild Steel in the Presence and Absence of Amino Thiol-Based Inhibitors - Bubble Test (Method A).

| Example | Inhibitor Composition | Inhibitor Conc. | Corrosion Rate (mpy) |
|---|---|---|---|
| 1 | No inhibitor (blank) | — | >100 |
| 2 | 1000 Mw Sodium polyaspartate (Comparative example) | 25 ppm | 29.3 |
| 3 | 2000 Mw sodium polyaspartate (Comparative Example) | 25 ppm | 24.3 |
| 4 | 3000 Mw Sodium polyaspartate (Comparative example) | 25 ppm | 21.3 |
| 5 | 5000 Mw Sodium polyaspartate (Comparative example) | 25 ppm | 21.2 |
| 6 | 5000 Mw sodium polyaspartate: thioglycolic acid (4:1 ratio w/w) | 25 ppm | 8.5 |
| 7 | 5000 Mw sodium polyaspartate: thioglycolic acid (24:1 ratio w/w) | 25 ppm | 5.2 |
| 8 | Cysteine | 25 ppm | 2.9 |
| 9 | 3000 Mw sodium polyaspartate: cysteine (99:1 ratio w/w) | 25 ppm | 1.4 |
| 10 | 3000 Mw sodium polyaspartate: cysteine (24:1 ratio w/w) | 25 ppm | 4.2 |
| 11 | 5000 Mw sodium polyaspartate: cysteine (4:1 ratio w/w) | 25 ppm | 2.9 |
| 12 | 5000 Mw sodium polyaspartate: cysteine (24:1 ratio w/w) | 25 ppm | 2 |
| 13 | 5000 Mw sodium polyaspartate: cysteine (99:1 ratio w/w) | 25 ppm | 3.4 |
| 14 | 5000 Mw sodium polyaspartate: cysteamine hydrochloride (4:1 ratio w/w) | 25 ppm | 2.9 |
| 15 | 5000 Mw sodium polyaspartate: cysteamine hydrochloride (24:1 ratio w/w) | 25 ppm | 1.9 |
| 16 | 5000 Mw sodium polyaspartate: cysteamine hydrochloride (99:1 ratio w/w) | 25 ppm | 2.5 |

TABLE 2

Corrosion Rates in Mils Per Year (mpy) of Mild Steel in the Presence and Absence of Amino Thiol and Disulfide Inhibitors-Dynamic Test (Method B).

| Example | Inhibitor Composition | Inhibitor Conc. | Corrosion Rate (mpy) |
|---|---|---|---|
| 17 | No inhibitor (blank) | — | >100 |
| 18 | Thioglycolic acid (Comparative example) | 25 ppm | 20 |
| 19 | Cysteine | 25 ppm | 2.9 |
| 20 | Cystine | 25 ppm | 8.2 |
| 21 | Cysteamine hydrochloride | 25 ppm | 7.5 |
| 22 | Cystamine dihydrochloride | 25 ppm | 6.2 |
| 23 | Cysteine | 2.5 ppm | 3.4 |
| 24 | 5000 Mw sodium polyaspartate: cysteine (9:1 ratio w/w) | 2.5 ppm | 2.8 |
| 25 | 5000 Mw sodium polyaspartate: cysteine (24:1 ratio w/w) | 2.5 ppm | 6.4 |
| 26 | 5000 Mw sodium polyaspartate: cysteine (24:1 ratio w/w) | 25 ppm | 1.7 |
| 27 | 5000 Mw sodium polyaspartate: cysteine (250:1 ratio w/w) | 25 ppm | 10 |
| 28 | 5000 Mw sodium polyaspartate: cysteine (50:1 ratio w/w) | 25 ppm | 4.5 |
| 29 | 5000 Mw sodium polyaspartate: cystine (250:1 ratio w/w) | 25 ppm | 11.9 |
| 30 | 5000 Mw sodium polyaspartate: cystine (50:1 ratio w/w) | 25 ppm | 4.9 |
| 31 | 5000 Mw sodium polyaspartate: cystamine dihydrochloride (24:1 ratio w/w) | 2.5 ppm | 2.8 |

TABLE 2-continued

Corrosion Rates in Mils Per Year (mpy) of Mild Steel in the Presence and Absence of Amino Thiol and Disulfide Inhibitors-Dynamic Test (Method B).

| Example | Inhibitor Composition | Inhibitor Conc. | Corrosion Rate (mpy) |
|---------|----------------------|-----------------|----------------------|
| 32 | 5000 Mw sodium polyaspartate: cystamine dihydrochloride (9:1 ratio w/w) | 2.5 ppm | 3.4 |
| 33 | 5000 Mw sodium polyaspartate: cystamine dihydrochloride (9:1 ratio w/w) | 25 ppm | 2.9 |

As Examples 2–5 in Table 1 indicate, sodium polyaspartate, at a 25 ppm concentration, provides corrosion protection to the extent of about 70 to 80% compared with no inhibitor (Example 1) in the Bubble Test. By comparison, the amino thiol inhibitor cysteine (Example 8) afforded a 2.9 mpy corrosion rate at 25 ppm concentration. This is equivalent to a corrosion inhibition of approximately 97%. Examples 9–13 illustrate the performance advantage of mixtures of amino thiols with acidic amino acid polymers comprising sodium polyaspartate. In all cases, decreases in corrosion rate were observed, even when relatively low concentrations of amino thiol were utilized. Examples 14–16 illustrate the same effect for the amino thiol cysteamine in combination with polyaspartate. By comparison, the combinations of sodium polyaspartate with thioglycolic acid, in Examples 6 and 7 were less effective than the combinations of Examples 9–16.

Examples 19–23 in Tables 2 illustrate the performance of both amino thiols and amino disulfides as corrosion inhibitors in the Dynamic Test. In comparison with thioglycolic acid (80% inhibition, Example 18), which has been employed as a corrosion inhibitor in oil production applications, the amino thiols and disulfides all provided improved corrosion inhibition (91–97% inhibition). Examples 24–28 again demonstrate that effective corrosion inhibition can be achieved via the combination of polyaspartate with amino thiol inhibitor (cysteine). In Examples 29–33, the relatively high degree of corrosion inhibition of mixtures of acidic amino acid polymer (polyaspartate) with relatively low levels of amino disulfide inhibitors (cystine and cystamine) is illustrated.

In addition to their corrosion inhibiting activity, the compositions of the present invention that include an amino thiol or amino disulfide compound together with an acidic amino acid polymer are also useful as mineral scale inhibitors. The presence of amino thiol or disulfide compounds does not significantly affect the scale inhibiting ability of the acidic amino acid component. For example, a composition comprising sodium polyaspartate (5000 Mw) and cysteamine hydrochloride in a ratio of 24:1 (as in Table 2, Example 29) was tested in a standard calcium carbonate scale inhibition test and showed no difference in performance from the polyaspartate alone. As an added performance benefit, the compositions of the present invention also do not interfere with the process used to separate the produced water from the crude oil.

We claim:

1. A method of inhibiting ferrous metal corrosion in a carbon dioxide containing aqueous system, which comprises:

adding to said aqueous system a corrosion inhibiting amount of an amino thiol or disulfide compound of the structure;

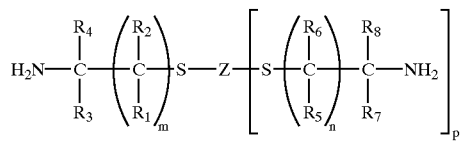

wherein $R_1$, $R_2$, $R_3$, $R_4$, $R_5$, $R_6$, $R_7$ and $R_8$ are, independently of one another, members of the group consisting of hydrogen, carboxyl, $C_1$ to $C_{18}$ alkyl, and $C_6$ to $C_{10}$ aryl;

Z is a member of the group consisting of hydrogen and covalent bond;

m and n are, independently of one another, 1, 2 or 3; and p is zero or 1, with the proviso that p is zero when Z is hydrogen.

2. The method of claim 1, wherein said amino thiol or disulfide compound is added to said aqueous system in an amount such that its concentration in said aqueous system falls within the range of about 0.1 ppm to about 1000 ppm on a weight basis.

3. The method of claim 1, wherein the amino thiol or disulfide compound is selected from the group consisting of; cysteine, cystine, cysteamine, cystamine and salts thereof.

4. The method of claim 1, wherein the pH of said aqueous system in the range of about 3 to about 7.

5. The method of claim 1, wherein said corrosion inhibiting amount is added to an aqueous system that additionally contains hydrogen sulfide.

6. The method of claim 1, further comprising the step of adding to said aqueous system additives selected from the group consisting of corrosion inhibitors, biocides, surfactants, scale inhibitors, and mixtures thereof.

7. The method of claim 1, further comprising the step of adding to said aqueous system a corrosion and scale inhibiting amount of an acidic amino acid polymer.

8. The method of claim 7, wherein said acidic amino acid polymer includes aspartic acid, glutamic acid, or salts thereof.

9. The method of claim 7, wherein said acidic amino acid polymer is selected from the group consisting of polyaspartic acid, polyglutamic acid, and a block or random copolymer comprising:

a) at least one amino acid derived moiety selected from the group consisting of aspartic acid and glutamic acid, and b) one or more co-monomers selected from the group consisting of polybasic carboxylic acids and anhydrides, fatty acids, polybasic hydroxycarboxylic acids, monobasic polyhydroxycarboxylic acids, amines, di and triamines, polyamines, hydroxyl-substituted aliphatic amines, carbohydrates, sugar carboxylic acids, amino acids, non-protein forming aminocarboxylic acids, lactams, lactones, diols, triols, polyols, unsaturated dicarboxylic and tricarboxylic acids, unsaturated monocarboxylic acids, derivatized aspartic acid residues, and derivatized glutamic acid residues, and wherein the sum of the aspartic and/or glutamic acid residues constitutes at least about 20% of the total number of residues in the polymer.

10. The method of claim 7, wherein said acidic amino acid polymer is polyaspartic acid or a salt thereof.

11. The method of claim 7, wherein said acidic amino acid polymer is added in an amount such that its concentration in said aqueous system is within the range of about 1 ppm to about 1000 ppm and the amino thiol or disulfide compound concentration is in the range of about 0.1 ppm to about 1000 ppm.

12. The method of claim 7, wherein said acidic amino acid polymer has a weight average molecular weight in the range of about 500 to about 100,000 daltons.

13. The method of claim 7, wherein said acidic amino acid polymer has a molecular weight in the range of about 1000 to about 20,000 daltons.

14. The method of claim 7, further comprising the step of adding to said aqueous system effective amounts of additional additives selected from the group consisting of: corrosion inhibitors, biocides, surfactants and scale inhibitors.

* * * * *